US012650370B2

(12) United States Patent
May et al.

(10) Patent No.: US 12,650,370 B2
(45) Date of Patent: Jun. 9, 2026

(54) MONITORING NANOPARTICLE ADDITIVES IN WELLBORE TREATMENT FLUID USING X-RAY FLUORESCENCE

(71) Applicant: Halliburton Energy Services, Inc., Houston, TX (US)

(72) Inventors: Preston Andrew May, Porter, TX (US); Jay Deville, Spring, TX (US); Sandeep Kumar Borra, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 317 days.

(21) Appl. No.: 18/388,046

(22) Filed: Nov. 8, 2023

(65) Prior Publication Data

US 2025/0146918 A1 May 8, 2025

(51) Int. Cl.
*G01N 15/06* (2024.01)
*E21B 49/08* (2006.01)
(Continued)

(52) U.S. Cl.
CPC ......... *G01N 15/06* (2013.01); *E21B 49/0875* (2020.05); *E21B 49/088* (2013.01);
(Continued)

(58) Field of Classification Search
CPC .... G01N 15/06; G01N 15/075; G01N 23/223; E21B 49/08; E21B 49/087; E21B 49/0875; E21B 49/088
See application file for complete search history.

(56) References Cited

U.S. PATENT DOCUMENTS 5,519,214 A    5/1996 Houwen et al.
10,564,115 B2    2/2020 Pals
(Continued)

FOREIGN PATENT DOCUMENTS

EP    0507405 B1    11/1998
EP    2534474 A2    12/2012
(Continued)

OTHER PUBLICATIONS

International Patent Application No. PCT/US2024/048493, International Search Report and Written Opinion mailed Jan. 6, 2025, 11 pages.

*Primary Examiner* — Paul M. West
(74) *Attorney, Agent, or Firm* — Kilpatrick Townsend & Stockton LLP

(57) ABSTRACT

A fluid monitoring system for monitoring a concentration of nanoparticle additives in wellbore treatment fluid using X-ray fluorescence (XRF) can include a preparation unit and an analysis unit. The preparation unit can generate a representative sample of the wellbore treatment fluid by performing a separation process with respect to a sample of the treatment fluid. The analysis unit can chemically analyze the subset of the treatment fluid sample using XRF to generate radiation intensity data of the representative sample. Based on the radiation intensity data, the fluid monitoring system can determine that the concentration of the nanoparticle additives is outside of a predefined range. In response to determining that the concentration of the nanoparticle additives in the representative sample is outside of the predefined range, the fluid monitoring system can perform a mitigation operation to modify the concentration of the plurality of nanoparticle additives to be within the predefined range.

20 Claims, 5 Drawing Sheets

(51) Int. Cl.
  *G01N 23/223* (2006.01)
  *B82Y 35/00* (2011.01)
(52) U.S. Cl.
  CPC ............ *G01N 23/223* (2013.01); *B82Y 35/00*
  (2013.01); *G01N 2223/076* (2013.01)

(56) References Cited

U.S. PATENT DOCUMENTS

| | | |
|---|---|---|
| 2010/0314108 A1 | 12/2010 | Crews et al. |
| 2013/0109100 A1* | 5/2013 | Sarkar ...................... C09K 8/03 |
| | | 977/773 |
| 2016/0299118 A1* | 10/2016 | Luong .................... E21B 49/08 |
| 2019/0367797 A1 | 12/2019 | Morgan et al. |
| 2021/0147305 A1 | 5/2021 | Singh et al. |
| 2021/0181108 A1* | 6/2021 | Burns ................ G01N 33/2823 |
| 2023/0184705 A1 | 6/2023 | Mitchell et al. |
| 2023/0272710 A1 | 8/2023 | Van Oort et al. |

FOREIGN PATENT DOCUMENTS

| | | |
|---|---|---|
| EP | 3156587 A1 | 4/2017 |
| WO | 2013162400 A1 | 10/2013 |
| WO | 2017102736 A1 | 6/2017 |

* cited by examiner

MONITORING NANOPARTICLE ADDITIVES IN WELLBORE TREATMENT FLUID USING X-RAY FLUORESCENCE

TECHNICAL FIELD

The present disclosure relates generally to wellbore operations and, more particularly (although not necessarily exclusively), to monitoring nanoparticle additives in wellbore treatment fluid using X-ray fluorescence (XRF).

BACKGROUND

A well system (e.g., oil or gas) may include a wellbore drilled through a subterranean formation. During the drilling of a subterranean well system, a fluid may circulate through a fluid circulation system that includes a drilling rig and fluid treatment and storage equipment located at or near a surface of a well. The fluid may be pumped by a fluid pump through an interior passage of a drill string, through a drill bit, and back to the surface through an annulus between a wellbore and the drill string. As the well is drilled, fluids, including gases and liquids from the subterranean formation, may be released and captured as the fluid is circulated.

DETAILED DESCRIPTION

Figure 1:
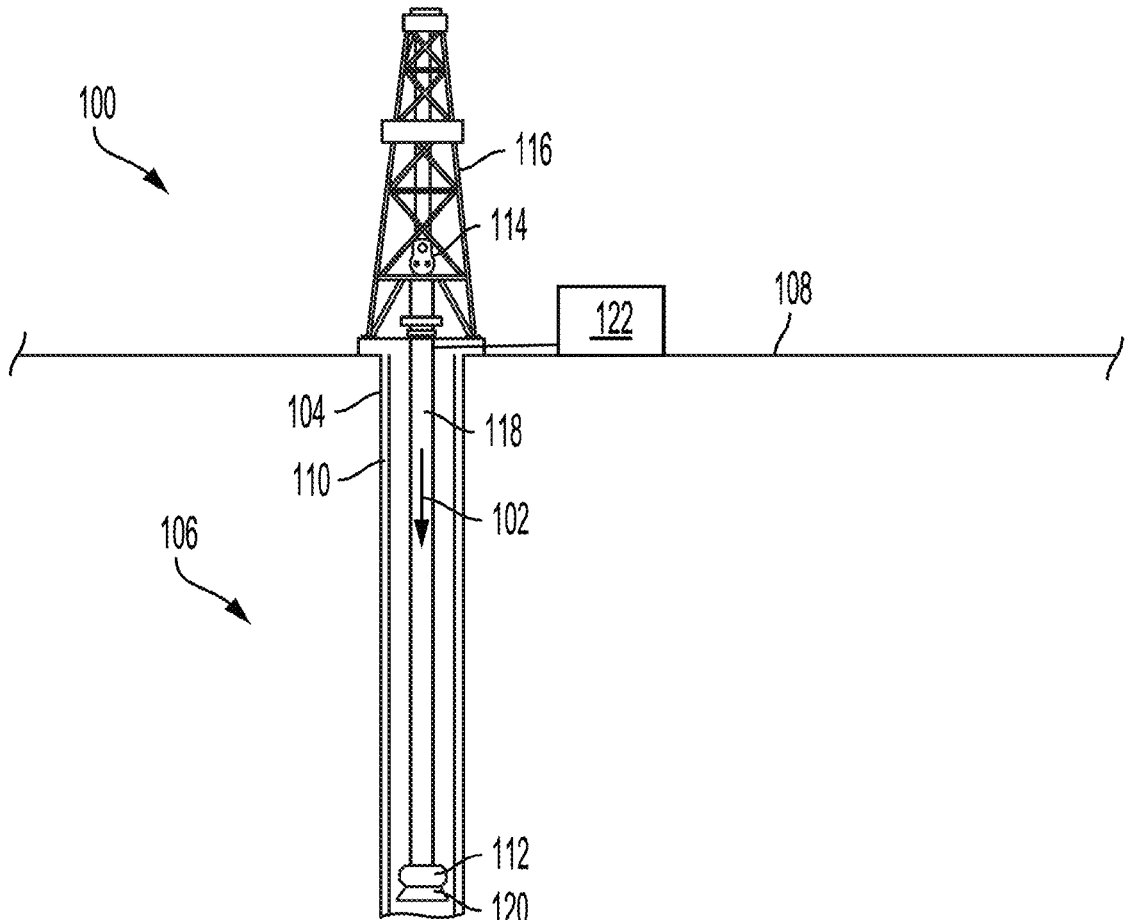
FIG. 1 is a cross-sectional view of a well system for monitoring nanoparticle additives in wellbore treatment fluid using X-ray fluorescence (XRF) according to one example of the present disclosure.

Certain aspects and examples of the present disclosure relate to monitoring nanoparticle additives in treatment fluid of a wellbore using X-ray fluorescence (XRF) at a wellsite. The treatment fluid can be provided downhole in the wellbore to address a wellbore condition using the nanoparticle additives in the treatment fluid. An effectiveness of the nanoparticle additives with respect to addressing the wellbore condition can depend on a concentration of the nanoparticle additives being within a predefined range. To ensure that the concentration is within the predefined range, a fluid monitoring system can collect and process samples of the treatment fluid to form representative samples to chemically analyze onsite using XRF. Using XRF to analyze the representative samples can involve applying a radiation source that can cause the representative samples to emit fluorescence due to excitation by the radiation source. The fluid monitoring system can analyze the fluorescence to determine the concentration of the nanoparticle additives in the representative sample. Using the fluid monitoring system to monitor the concentration of the nanoparticle additives onsite can enable timely adjustments to the treatment fluid to maintain the concentration of the nanoparticle additives within the predefined range.

The concentration of the nanoparticle additives can begin to vary once the treatment fluid is pumped downhole into the wellbore. The fluid monitoring system can increase efficiency in monitoring the concentration of the nanoparticle additives in the treatment fluid by implementing the fluid monitoring system onsite such that the representative sample can be analyzed relatively quickly. In some cases, offsite lab testing may have a turnaround time of days or weeks to account for transporting the representative sample to an offsite laboratory for analysis. In contrast, an analysis unit of the fluid monitoring system may provide XRF measurements of the representative sample in a few seconds or minutes. Additionally, the fluid monitoring system can enable direct measurement of the concentration of the nanoparticle additives using the analysis unit. Performance tests, such as particle-plugging apparatus (PPA) tests, can indirectly provide an indication of the concentration of the nanoparticle additives but may fail to provide an accurate or granular quantification of the nanoparticle additives. Uncertainty regarding the concentration of the nanoparticle additives can cause delays, miscalculations, or errors during wellbore operations. Thus, using the fluid monitoring system to analyze the concentration of the nanoparticle additives can facilitate timely, well-informed decisions associated with the wellbore operations.

Processing the samples of the treatment fluid can involve a separation process performed by a preparation unit of the fluid monitoring system. For instance, the treatment fluid may include solid particles that can interfere with analyzing the samples using XRF. Accordingly, the preparation unit of the fluid monitoring system may remove the solid particles from the samples to form the representative samples, for example by centrifuging, distilling, or filtering the samples. In some cases, the preparation unit may add a chemical compound to the samples to facilitate the separation process. For instance, the preparation unit may add a coagulating agent to agglomerate the solid particles such that the agglomerated solid particles settle out of solution. Additionally or alternatively, the preparation unit can add a solvent selected to selectively extract the nanoparticle additives into the solvent, thereby separating the nanoparticle additives from the solid particles.

Instead of using offsite laboratory equipment, the fluid monitoring system can incorporate handheld XRF spectrometers that can be transported by operators around the wellsite. Accordingly, the handheld XRF spectrometers can provide flexibility and transportability with respect to obtaining the XRF measurements of the representative sample. The handheld XRF spectrometers may measure the representative samples as liquid samples or as solid samples, such as after undergoing dehydration. Once the XRF measurements are obtained, the fluid monitoring system can use the XRF measurements to determine whether the concentration of the nanoparticle additives is within the predefined range. In some instances, the nanoparticle additives may be synthesized to include a specific element that can be targeted during XRF analysis. As a result, an element concentration of the specific element in the representative sample can correspond to the concentration of the nanoparticle additives in the representative sample.

The concentration of the nanoparticle additives being outside of the predefined range can result in detrimental conditions, such as overtreatment or undertreatment by the treatment fluid. For instance, if the nanoparticle additives function as a sealant, the concentration of the nanoparticle additives being below a minimum threshold of the pre-defined range can increase a risk of wellbore instability that can impede drilling time and efficiency. As a result, if the concentration is below the minimum threshold of the pre-defined range, the fluid monitoring system can implement a mitigation operation to increase the concentration to be above the minimum threshold. Alternatively, if the concentration is above a maximum threshold of the predefined range, the fluid monitoring system instead can decrease the concentration of the nanoparticle additives as the mitigation operation.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a cross-sectional view of a wellsite 100 for monitoring nanoparticle additives in wellbore treatment fluid 102 using X-ray fluorescence (XRF) according to one example of the present disclosure. As depicted in FIG. 1, the wellsite 100 includes a wellbore 104 drilled through a subterranean formation 106, for example to extract hydrocarbons from the subterranean formation. In some examples, the wellbore 104 can be formed during a wellbore operation, such as a drilling operation. The wellbore 104 extends from a well surface 108 into strata of the subterranean formation 106. The strata can include different materials (e.g., rock, soil, oil, water, gas, etc.) and can vary in thickness and shape. In some examples, the wellsite 100 may include more than one wellbore 104. Additionally, the wellbore 104 can be vertical as depicted, deviated, horizontal, or any combination thereof. Although the wellbore 104 is depicted as a land-based well, it will be appreciated that the wellbore 104 can be a subsea well. Accordingly, techniques described herein for monitoring the nanoparticle additives in the treatment fluid 102 using XRF can be applied in subsea well implementations.

The wellbore 104 can be cased, open-hole, or a combination thereof. For example, a casing string 110 can extend from the well surface 108 through the subterranean formation 106. In some examples, the casing string 110 can be coupled to walls of the wellbore 104 via cement. For example, a cement sheath can be positioned or formed between the casing string 110 and the walls of the wellbore 104 to couple the casing string 110 to the wellbore 104. The casing string 110 may provide a conduit through which the treatment fluid 102, such as drilling fluid used in a drilling operation, can be transported downhole (e.g., pumped) into the wellbore 104 from the well surface 108. Additional examples of the treatment fluid 102 can include fracking fluid, sealing fluid, cleaning fluid (e.g., scale removal fluid), acidizing fluid, or other suitable types of wellbore treatment fluid 102 used during different stages of well completion. For instance, if the treatment fluid 102 is cleaning fluid, the nanoparticle additives of the treatment fluid 102 can include nanosilica particles that can improve cuttings transport efficiency during a cuttings removal process to clean the wellbore 104.

The wellbore 104 additionally can include one or more well tools, such as a bottomhole assembly 112. In the example shown in FIG. 1, the bottomhole assembly 112 is positioned in the wellbore 104 by a winch 114 in a derrick 116 positioned above the well surface 108. In other examples, the bottomhole assembly 112 may be positioned in the wellbore 104 in another manner. The bottomhole assembly 112 can be coupled to a tool string 118 to position the bottomhole assembly 112 in the wellbore 104. The bottomhole assembly 112 can be transported into the wellbore 104 by manipulating the tool string 118 using, for example, a guide or the winch 114. In some examples, a wireline or slickline may be used in place of the tool string 118.

The bottomhole assembly 112 can include a drill bit 120 to penetrate the subterranean formation 106 to form the wellbore 104. The bottomhole assembly 112 can provide control of the drill bit 120 as the drill bit 120 advances into the subterranean formation 106. While the drill bit 120 forms the wellbore 104, the treatment fluid 102 can be pumped downhole into the wellbore 104. The treatment fluid 102 can include the nanoparticle additives to facilitate the wellbore operation, for example by improving wellbore stability or controlling fluid loss. In some examples, the bottomhole assembly 112 can include one or more components in addition to the drill bit 120. Examples of the components can include a logging-while-drilling (LWD) module, a measuring-while-drilling (MWD) module, a rotary steerable system, a motor, or any combination thereof.

A monitoring system 122 positioned at the well surface 108 of the wellsite 100 can collect one or more samples of the treatment fluid 102 to chemically analyze and determine whether a concentration of the nanoparticle additives is within a predefined threshold or predefined range. In some examples, the concentration of the nanoparticle additives can vary due to the nanoparticle additives interacting with materials (e.g., liquids, gases, cuttings, etc.) from the subterranean formation 106. For example, if the treatment fluid 102 is drilling fluid, the treatment fluid 102 can circulate within the wellbore 104 to transport the materials from the subterranean formation 106 to the well surface 108. In some instances, the materials removed from the subterranean formation 106 can include a subset of the nanoparticle additives that have interacted with the materials, thereby depleting the concentration of the nanoparticle additives in the wellbore 104. In some cases, a sampling unit of the monitoring system 122 can be positioned in the bottomhole assembly 112 to collect the samples of the treatment fluid 102. Once the samples are collected downhole, the sampling unit may store the samples until the samples can be returned to the well surface 108. In other cases, the sampling unit may be positioned at the well surface 108 (e.g., on a rig, coupled to a mud tank, etc.) to collect the samples of the treatment fluid 102.

By chemically analyzing the samples of the treatment fluid 102, the monitoring system 122 can ensure that the concentration of the nanoparticle additives in the treatment fluid 102 is maintained within the predefined range. As an example, if the treatment fluid 102 is acidizing fluid, the nanoparticle additives can function as a diverting agent that can direct the acidizing fluid toward or away from a particular region of the subterranean formation 106. Additionally, the nanoparticle additives functioning as the diverting agent may control a flow rate at which the treatment fluid 102 is introduced into the subterranean formation 106 while an injection rate of the treatment fluid 102 is unchanged. As a result, the concentration of the nanoparticle additives being outside the predefined range may cause the treatment fluid 102 to flow into the subterranean formation 106 at an abnormal or uncontrolled rate. If the monitoring system 122 detects that the concentration of the nanoparticle additives is outside of the predefined range, the monitoring system 122 can perform a mitigation operation to increase or decrease the concentration. In some cases, if the monitoring system 122 determines that the concentration of the nanoparticle additives is within the predefined range, the monitoring system 122 may forgo performing the mitigation operation (e.g., maintain status quo with respect to a wellbore operation involving the nanoparticle additives).

Figure 2:
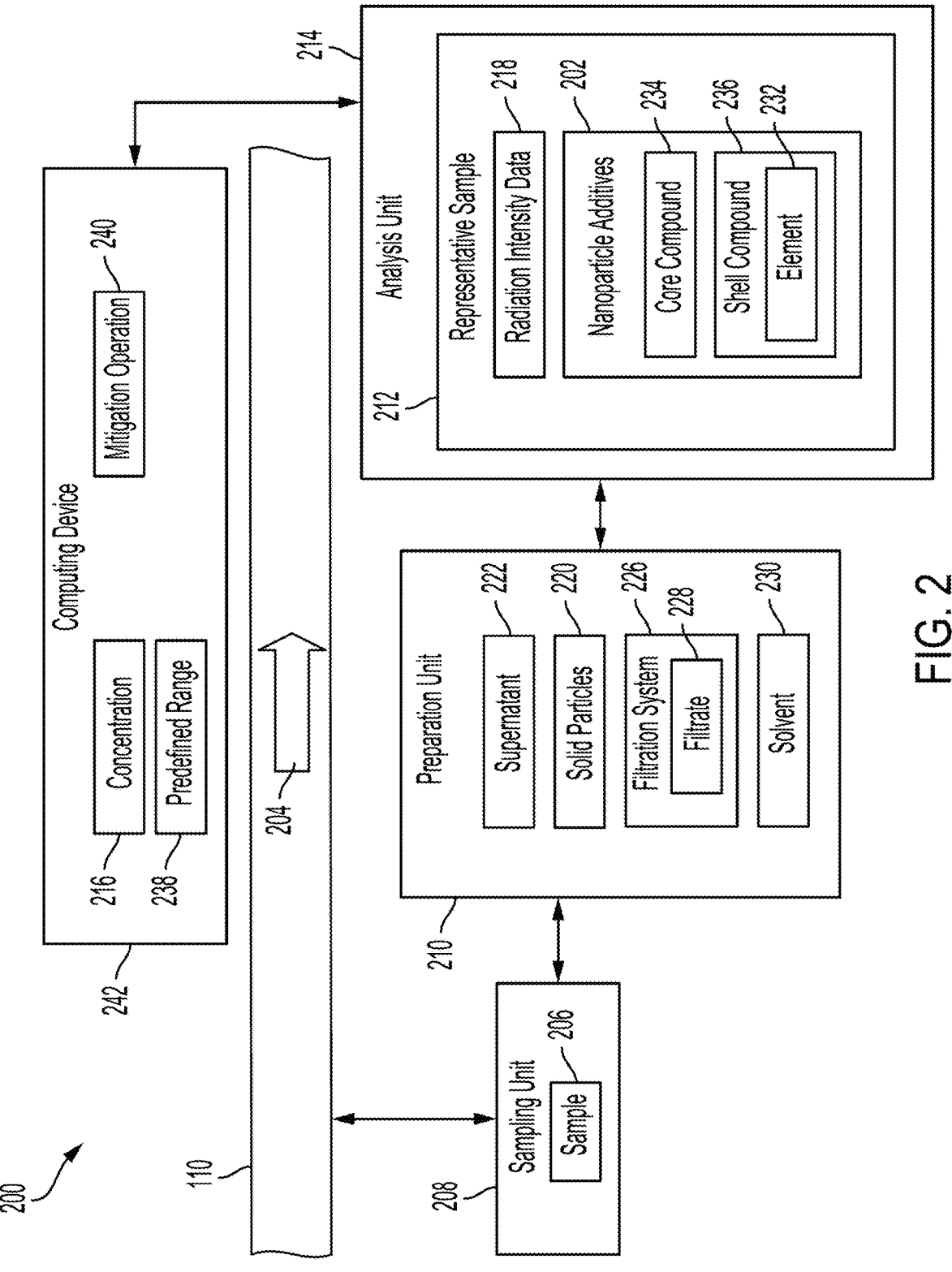
FIG. 2 is a block diagram of a monitoring system for monitoring nanoparticle additives in wellbore treatment fluid using XRF according to one example of the present disclosure.

FIG. 2 is a block diagram of a monitoring system 200 for monitoring nanoparticle additives 202 in wellbore treatment fluid 204 using X-ray fluorescence (XRF) according to one example of the present disclosure. In some examples, the monitoring system 200 can be the monitoring system 122 that is positioned at the wellsite 100 of FIG. 1. A sampling unit 208 of the monitoring system 200 can collect a sample 206 of the treatment fluid 204. The sample 206 can be processed using a preparation unit 210 to form a representative sample 212. An analysis unit 214 of the monitoring system 200 can analyze the representative sample 212 to determine a concentration 216 of the nanoparticle additives 202 in the representative sample 212. Examples of the nanoparticle additives 202 can include iron oxide, titanium oxide, magnesium oxide, polymers, etc. In particular, the analysis unit 214 can implement XRF to generate radiation intensity data 218 associated with the representative sample 212 that can be used to determine the concentration 216 of the nanoparticle additives 202.

In some cases, the sampling unit 208 can include one or more sampling points to collect the sample 206 as the treatment fluid 204 flows through a pipeline (e.g., the casing string 110 of FIG. 1). For example, the sampling points can be positioned external to the sampling unit 208 (e.g., within or along an exterior of the casing string). Each fluid sample from each sampling point can be combined to create the sample 206 of the treatment fluid 204 that can be processed to form the representative sample 212. Alternatively, each fluid sample may be process and analyzed separately. In some implementations, the sampling unit 208 may be positioned downhole in a wellbore (e.g., the wellbore 104 of FIG. 1). Additionally or alternatively, the sampling unit 208 can be positioned at a well surface (e.g., the well surface 108 of FIG. 1) to sample the treatment fluid 204 at the well surface.

After the sampling unit 208 collects the sample 206, the preparation unit 210 of the monitoring system 200 can perform a separation process on the sample 206 of the treatment fluid 204 to prepare the representative sample 212. The separation process can involve isolating or separating the nanoparticle additives 202 in the sample 206 of the treatment fluid 204 to facilitate chemical analysis (e.g., XRF) with respect to the nanoparticle additives 202. For example, distillation can be implemented as at least part of the separation process to separate solid components of the sample 206 from liquid components of the sample 206 while retaining both components for analysis. In some cases, the separation process may remove unsuitable compounds (e.g., impurities, interferences, or contaminants) that can interfere with the chemical analysis of the treatment fluid 204. For example, the preparation unit 210 may include a centrifuge to form the representative sample 212 by removing solid particles 220 (e.g., drill solids, drilling fluid polymers, weighting agents, etc.) from the sample 206. Centrifuging the sample 206 can separate the sample 206 into a supernatant 222 and the solid particles 220. The supernatant 222 can be the representative sample 212 and can include the nanoparticle additives 202 suspended in solution. The solid particles 220 of the sample 206 can be discarded after being separated out from the sample 206.

As another example, the preparation unit 210 additionally or alternatively can include a filtration system 226 to filter out the solid particles 220 in the sample 206 to form the representative sample 212. The filtration system 226 can include one or more filters that can be implemented to selectively remove the solid particles 220 from the sample 206 while the nanoparticle additives 202 remain in solution. For example, the filters can be selected such that an effective pore size of the filters prevent the solid particles 220 from passing through the filters. In some cases, the filters may implement coarse filtration, fine filtration, or a combination thereof. Accordingly, a filtrate 228 formed after passing the sample 206 through the filtration system 226 can be the representative sample 212 that can include the nanoparticle additives 202.

Besides centrifugation or filtration, the preparation unit 210 can perform the separation process by adding an additional component to the sample 206 to remove the unsuitable compounds from the sample 206. As an example, the preparation unit 210 can add a clarifying agent (e.g., a chemical coagulant) to the sample 206 to implement selective flocculation, thereby degrading suspension properties of the solid particles 220 in the sample 206. In particular, the clarifying agent may cause the solid particles 220 to agglomerate and form solid clusters with a larger size than the solid particles 220. As a result, the solid clusters may settle out of solution or facilitate the removal of the solid particles 220, such as through centrifugation. As another example, the preparation unit 210 can implement the separation process by adding a solvent 230 to the sample 206 of the treatment fluid 204. The solvent 230 can be selected to perform a selective extraction of the nanoparticle additives 202 from the sample 206 into the solvent 230, thereby separating the nanoparticles additives 202 from the unsuitable compounds.

Additionally or alternatively, an amount of the nanoparticle additives 202 in the sample 206 may be too low (e.g., below a measurement threshold) for direct analysis. The separation process can generate the representative sample 212 by concentrating the nanoparticle additives 202 to enable direct analysis of the nanoparticle additives 202. In some examples, once the representative sample 212 is formed, the analysis unit 214 can perform XRF on the representative sample 212 as a liquid sample. In other examples, the representative sample 212 may be further processed by dehydrating the representative sample 212 to form a dehydrated sample to concentrate the nanoparticle additives 202 in the representative sample 212. For example, the representative sample 212 can be heated, placed under vacuum, or a combination thereof to remove liquid from the representative sample 212 (e.g., dehydrate the representative sample 212) and form a solid sample. Additionally or alternatively, dehydrating the representative sample 212 can remove additional compounds (e.g., organic contaminants) that may interfere with XRF measurements, for example by combusting the additional compounds.

Once the representative sample 212 is prepared by the preparation unit 210, the analysis unit 214 can chemically analyze the representative sample 212 to generate the radiation intensity data 218 corresponding to the representative sample 212. For example, the analysis unit 214 can provide a radiation beam that can displace inner electrons positioned in inner orbital shells of atoms in the representative sample 212. Examples of the radiation beam can include X-rays or gamma rays. Once the inner electrons are displaced by the radiation beam, outer electrons (e.g., valence electrons) of the atoms that are positioned in outer orbital shells can replace the displaced inner electrons to fill vacancies left by the displaced inner electrons. When the outer electrons move to the inner orbital shells, the outer electrons lose energy that is emanated as fluorescence that the analysis unit 214 can detect. The fluorescence emitted through XRF can be unique to each element in the representative sample 212, thereby enabling the analysis unit to identify a chemical composition of the representative sample 212. For example, the analysis unit 214 may target an element 232 (e.g., silicon, sulfur, iron, titanium, etc.) in the nanoparticle additives 202 when analyzing the representative sample 212 using XRF. In some cases, the element 232 can function as an identifier for the nanoparticle additives 202, for example to differentiate the nanoparticle additives from other compounds present in the treatment fluid 204.

The chemical composition of the representative sample 212 can indicate the concentration 216 of the nanoparticle additives 202 in the representative sample 212. If the concentration 216 of the nanoparticle additives 202 is outside (e.g., below or above) a predefined range 238, the monitoring system 200 may perform or initiate a mitigation operation 240 to modify the concentration 216 to be within the predefined range 238. Alternatively, if the concentration 216 of the nanoparticle additives 202 is within the predefined range 238, the monitoring system 200 can forgo implementing the mitigation operation 240. Although the analysis unit 214 is primarily described as using XRF to analyze the representative sample 212, other analytical techniques (e.g., mass spectrometry, dynamic light scattering, etc.) may be possible.

In some implementations, the nanoparticle additives 202 may have a homogeneous composition such that the nanoparticles additives 202 are synthesized using a single chemical compound. In other implementations, the nanoparticle additives 202 may be core-shell nanoparticles that can include a core compound 234 and a shell compound 236 surrounding the core compound 234. In some examples, the shell compound 236 can be formed to include the element 232 of the nanoparticle additives 202 to target using XRF. For example, if the shell compound 236 is a copolymer, the shell compound 236 can be generated by polymerizing at least a first monomer and a second monomer. In some cases, the second monomer may include the element 232 targeted by the analysis unit 214 using XRF. In other examples, the first monomer may instead include the targeted element 232. Although the shell compound 236 is described with respect to the first monomer and the second monomer, more than two monomers may be present in the copolymer. In additional or alternative examples, the core compound 234 may be formed to include the element 332 that can be targeted using XRF. Similar to providing the element 232 in the shell compound 236, the core compound 234 can be generated by polymerizing monomers to form a polymer including the targeted element 232.

Figure 3:
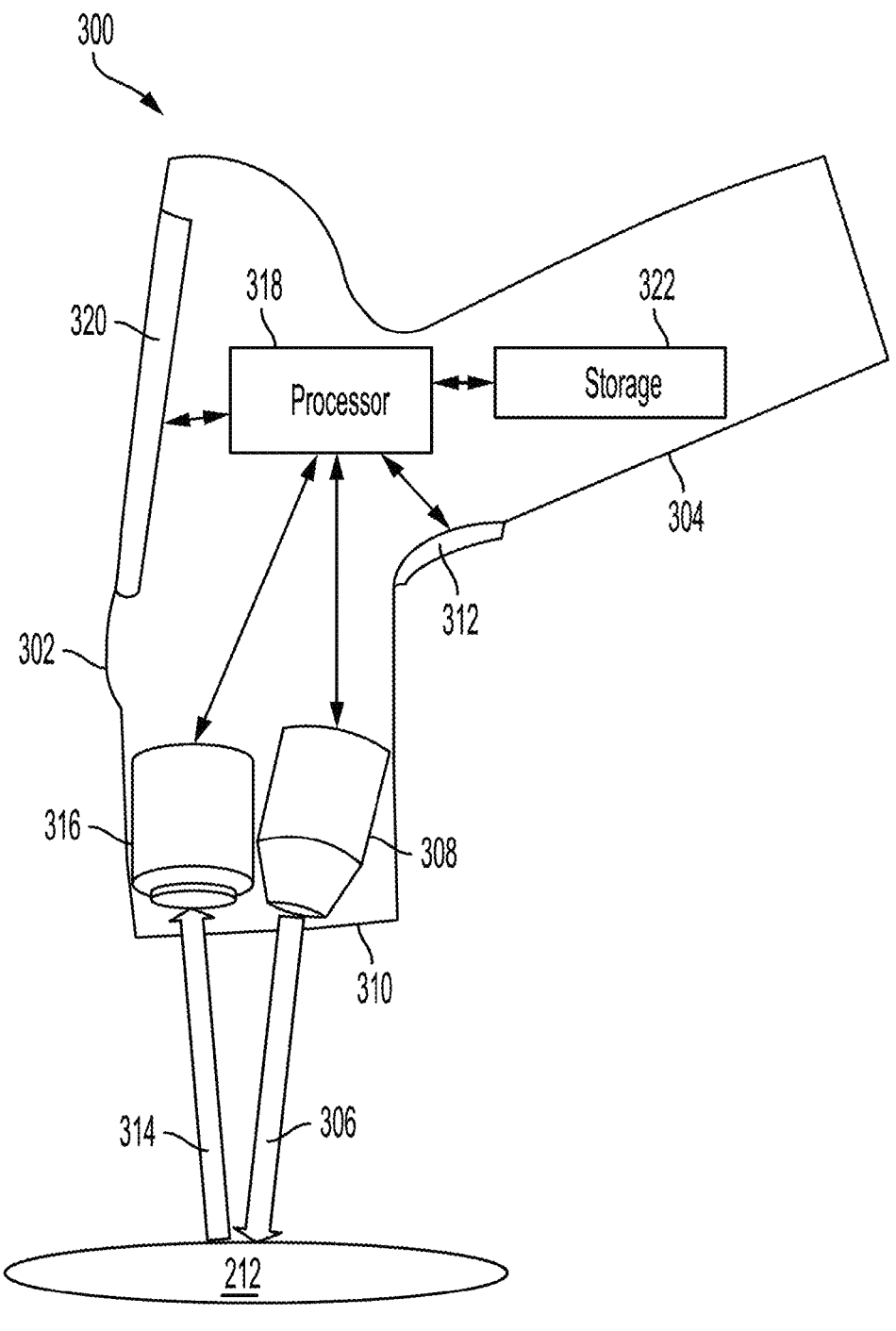
FIG. 3 is a cross-sectional view of a handheld device for monitoring nanoparticle additives in wellbore treatment fluid using XRF.

In some examples, the analysis unit 214 may be coupled to the preparation unit 210 to receive the representative sample 212 after the representative sample 212 is prepared by the preparation unit 210. In other examples, the analysis unit 214 can be a portable device that can be transported by an operator to a suitable location at the wellsite. For example, FIG. 3 is a cross-sectional view of a handheld device 300 for monitoring nanoparticle additives 202 in wellbore treatment fluid 204 using X-ray fluorescence (XRF). The handheld device 300 is described below with reference to components described above with respect to FIG. 2. The handheld device 300 can enable relatively quick XRF measurements while providing flexibility with respect to positioning or transportation of the handheld device 300. For example, the handheld device 300 may be smaller in size than a stationary XRF device. A body 302 of the handheld device 300 can include a handle 304 that an operator can hold while positioning or moving the handheld device 300.

To provide a radiation beam 306 used in XRF, the handheld device 300 can include a radiation source 308 in the body 302 of the handheld device 300. In some cases, the body 302 of the handheld device 300 can ensure that radiation from the radiation source 308 is directed to a representative sample 212 for XRF analysis through an opening 310 pointing to the representative sample 212. An interactive element 312 (e.g., a trigger, button, switch, etc.) can be positioned in the body 302 such that the operator can interact with the interactive element to indicate when to initiate an XRF measurement. For example, once the operator suitably positions the handheld device 300, the operator may press and hold the interactive element 312 such that the radiation source 308 emits the radiation beam 306 toward the representative sample 212.

When the radiation beam 306 contacts the representative sample 212, the representative sample 212 can emit fluorescence 314 (e.g., one or more fluorescent X-rays) based on electron displacement caused by the radiation beam 306. The fluorescence 314 can correspond to a difference in energy between two quantum states of electrons in the representative sample 212 that were displaced by the radiation beam 306. Replacement electrons that transition from a higher orbital than the displaced electrons can fill vacancies of the displaced electrons, thereby generating the fluorescence 314. Each element present in the representative sample 212 can produce a set of characteristic fluorescence signals unique to the element as part of the fluorescence 314. A detector 316 positioned in the body 302 of the handheld device 300 can detect the fluorescence 314 released by the representative sample 212. Based on the detected fluorescence 314, the handheld device 300 can generate radiation intensity data 218. In some cases, the detector 316 can transmit the radiation intensity data 218 associated with the fluorescence 314 to a processor 318 (e.g., a central processing unit (CPU)) of the handheld device 300.

The processor 318 can be communicatively coupled to components of the handheld device 300 to control the XRF analysis. For example, the processor 318 can be communicatively coupled to the radiation source 308 and the interactive element 312 to control when the radiation source 308 emits the radiation beam 306. Additionally, the processor 318 can be communicatively coupled to the detector 316 to receive the radiation intensity data 218 from the detector 316. Using the radiation intensity data 218, the processor 318 can quantify a chemical composition of the representative sample 212. The chemical composition of the representative sample 212 can correspond to a concentration 216 of the nanoparticle additives 202 in the representative sample 212. For example, the nanoparticle additives 202 may include an element 232 that is unlikely to be present in other compounds in the treatment fluid 204. Accordingly, a quantity of the element 232 determined using the radiation intensity data 218 can indicate the concentration 216 of the nanoparticle additives 202 in the representative sample 212. In some cases, the processor 318 may determine relative percentages of each element in the representative sample 212 as part of determining the concentration 216 of the nanoparticle additives 202 in the representative sample 212.

In some examples, the handheld device 300 may include a display device 320 communicatively coupled to the processor 318. The processor 318 can output the radiation intensity data 218, the chemical composition, or a combination thereof via the display device 320. As an example, the processor 318 may output detected concentrations of each element in the representative sample 212 as the chemical composition of the representative sample 212. Additionally, the operator can use the display device 320 to obtain the chemical composition of the representative sample 212, for example using a calibration curve relating fluorescence intensity to the concentration 216 of the nanoparticle additives 202. Accordingly, the operator can make adjustments to a wellbore operation based on the chemical composition obtained using the handheld device 300. In particular, the operator can initiate a mitigation operation 240 to adjust the concentration 216 of the nanoparticle additives 202 to be within the predefined range 238.

Additionally, the handheld device 300 can include a storage 322 communicatively coupled to the processor 318 to store instructions executable by the processor 318 to perform operations described above with respect to making XRF measurements. In some cases, the storage 322 may enable the handheld device 300 to store the radiation intensity data 218 to compare with later measurements, for example to identify a trend in the chemical composition over time. Additionally or alternatively, the storage 322 can include one or more software programs that can be executed by the processor 318 to perform a quantitative analysis on the radiation intensity data 218 obtained by the detector 316. The quantitative analysis can be used to convert the radiation intensity data 218 into individual element concentrations associated with the representative sample 212. In some examples, the software programs can account for matrix effects caused by interactions between fluorescence signals of different elements. As an example, if both chlorine and lead is present in the representative sample 212, an intensity peak associated with lead in the radiation intensity data may be relatively low due to absorption by chlorine atoms.

Returning to FIG. 2, the monitoring system 200 can include a computing device 242 that can receive the radiation intensity data 218 of the representative sample 212 from the analysis unit 214. For example, the computing device 242 can be coupled to the analysis unit 214 using a wired connection or a wireless connection. Examples of the wireless connection can include IEEE 802.11, Bluetooth, or radio interfaces for accessing cellular telephone networks (e.g., transceiver/antenna for accessing a CDMA, GSM, UMTS, or another mobile communications network). Examples of the wired connection can include Ethernet, universal serial bus (USB), IEEE 1394, or a fiber optic interface.

Using the radiation intensity data 218, the computing device 242 can determine whether the concentration 216 of the nanoparticle additives 202 is within the predefined range 238. To determine a respective element concentration of each element in the representative sample 212, the computing device 242 can match intensity peaks of the radiation intensity data 218 to individual elements in the representative sample 212. The predefined range 238 of the concentration 216 can correspond to effectiveness of the nanoparticle additives 202, for example with respect to addressing a wellbore condition. As an example, if the nanoparticle additives 202 are a plugging agent, the concentration 216 of the nanoparticle additives 202 being below a minimum threshold of the predefined range 238 can fail to prevent or control fluid loss in the wellbore. In some cases, if the concentration 216 is outside of the predefined range 238, the computing device 242 can implement the mitigation operation 240 to adjust the concentration 216 of the nanoparticle additives 202 in the treatment fluid 204. For instance, the mitigation operation 240 may involve adjusting a fluid composition of the treatment fluid 204 to increase the concentration 216 of the nanoparticle additives in the treatment fluid 204 to be within the predefined range 238.

Figure 4:
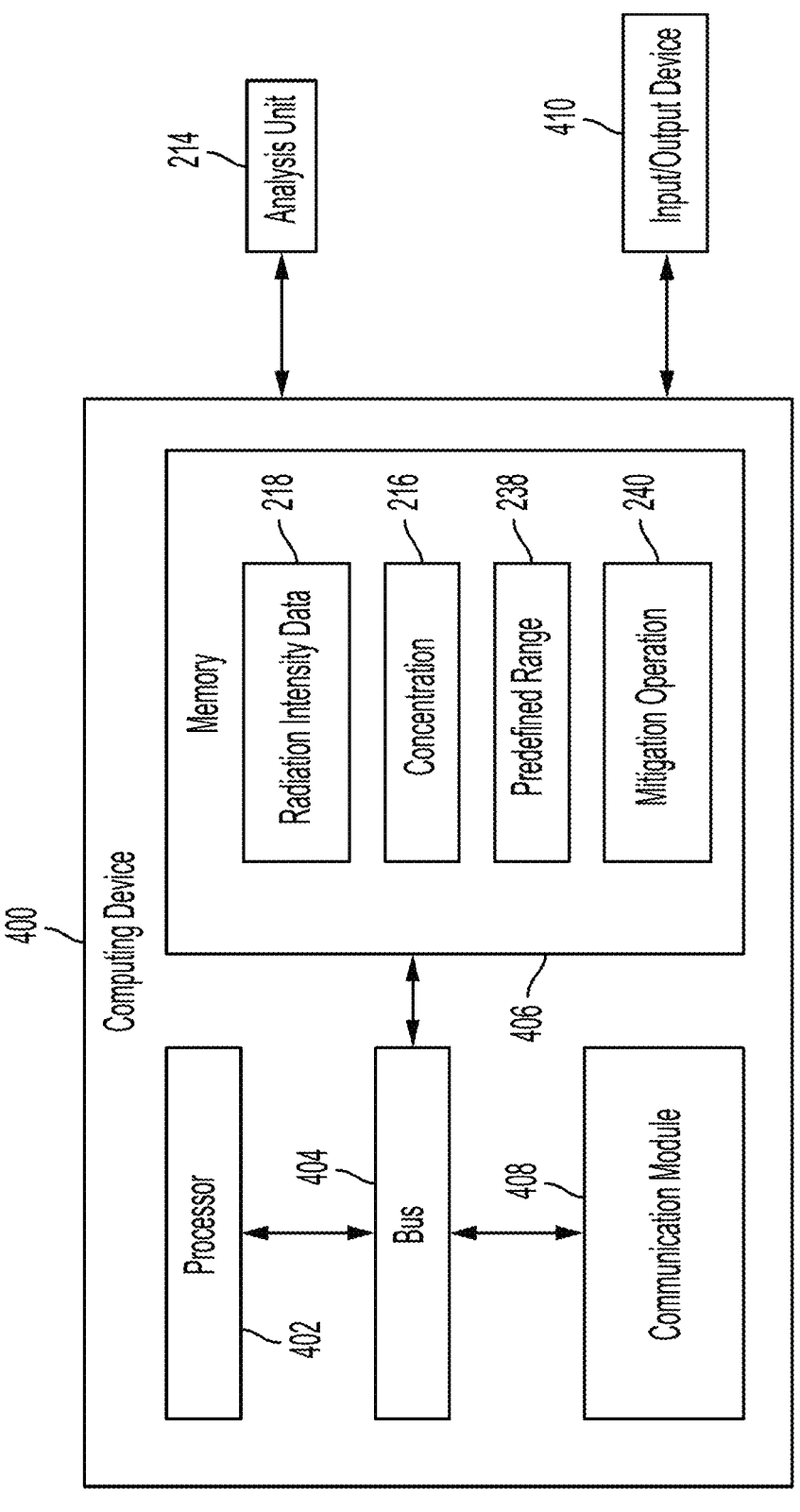
FIG. 4 is a block diagram of a computing device for monitoring nanoparticle additives in wellbore treatment fluid using XRF.

FIG. 4 is a block diagram of a computing device 400 for monitoring nanoparticle additives in wellbore treatment fluid using X-ray fluorescence (XRF). The computing device 400 is described below with reference to components discussed above in FIGS. 1-3. In some cases, one or more components of the computing device 400 may be integrated with the handheld device 300 of FIG. 3 (e.g., as the processor 318 and storage 322). In other cases, the computing device 400 can be communicatively coupled to the handheld device 300, such as through a wireless connection.

The computing device 400 may include a processor 402 and a memory 404 coupled to the processor 402 via a bus 406. In some examples, a communication module 408 additionally can be coupled to the processor 402 via the bus 406. The processor 402 may execute one or more operations to determine whether a concentration 216 of the nanoparticle additives 202 is within a predefined range 238. For example, the operations may involve obtaining XRF measurements from the analysis unit to compare to the predefined range 238. The processor 402 may execute instructions stored in the memory 404 to perform the operations. The processor 402 may include one processing device or multiple processing devices. Non-limiting examples of the processor 402 include a Field-Programmable Gate Array (FPGA), an application-specific integrated circuit (ASIC), a microprocessor, etc.

The processor 402 may be communicatively coupled to the memory 404 via the bus 406. The non-volatile memory 404 may include any type of memory device that retains stored information when powered off. Non-limiting examples of the memory 404 include electrically erasable and programmable read-only memory (EEPROM), flash memory, or any other type of non-volatile memory. In some examples, at least part of the memory 404 can include a medium from which the processor 402 can read instructions. A non-transitory computer-readable medium can include electronic, optical, magnetic, or other storage devices capable of providing the processor 402 with computer-readable instructions or other program code. Non-limiting examples of a computer-readable medium include (but are not limited to) magnetic disk(s), memory chip(s), ROM, random-access memory (RAM), an ASIC, a configured processor, optical storage, or any other medium from which a computer processor can read instructions. The instructions can include processor-specific instructions generated by a compiler or an interpreter from code written in any suitable computer-programming language, including, for example, C, C++, C #, etc.

In some examples, the memory 404 may include computer program instructions for executing processes that involve determining the concentration 216 of the nanoparticle additives 202 in treatment fluid 204 based on XRF measurements (e.g., radiation intensity data 218) from an analysis unit 214. In some cases, the XRF measurements can be provided to the computing device 400 as a chemical composition of at least one representative sample 212 prepared from the treatment fluid 204. The memory 404 may also include computer program instructions for executing processes that involve determining a mitigation operation 240 to adjust the concentration 216 of the nanoparticle additives 202 in the treatment fluid 204 if the concentration 216 is outside of the predefined range 238.

The communication module 408 may include or may be coupled to a communications system to control equipment remotely. The communications system can include a modem, a network card, an infrared communication device, a wireless communication device, a chipset (e.g., a Bluetooth device, an 802.11 device, a Wi-Fi device, a WiMax device, cellular communication device, etc.) or a combination thereof. In some examples, at least part of the communication module 408 may be implemented in software. For example, the communication module 408 may include instructions stored in the memory 404. The communication module 408 may receive signals from remote devices and transmit data to remote devices. For example, the communication module 408 may transmit wireless communications that are modulated by data. In some implementations, the communication module 408 may receive signals (e.g., associated with data to be transmitted) from the processor 402 and may amplify, filter, modulate, frequency shift, and otherwise manipulate the signals.

The computing device 400 may receive input (e.g., the radiation intensity data 218) from the analysis unit 214. The computing device 400 can also include an input/output device 410. Examples of the input/output device 410 can include a keyboard, pointing device, display, or other suitable computer input/output devices. An operator may provide input to the computing device 400 using the input/output device 410. In some cases, such input may include confirmation that the concentration 216 of the nanoparticle additives 202 is outside of the predefined range 238. Additionally or alternatively, the input may provide confirmation that the mitigation operation 240 to adjust the concentration 216 should be performed (e.g., by injecting an additional amount of the nanoparticle additives 202 into the treatment fluid 204).

Although FIGS. 1-4 show a certain number and arrangement of components, these examples are intended to be illustrative and non-limiting. Other examples may include more components, fewer components, different components, or a different arrangement of the components shown in FIGS. 1-4. For instance, the computing device 400 may be part of the handheld device 300. Any suitable arrangement of the depicted components is contemplated herein.

Figure 5:
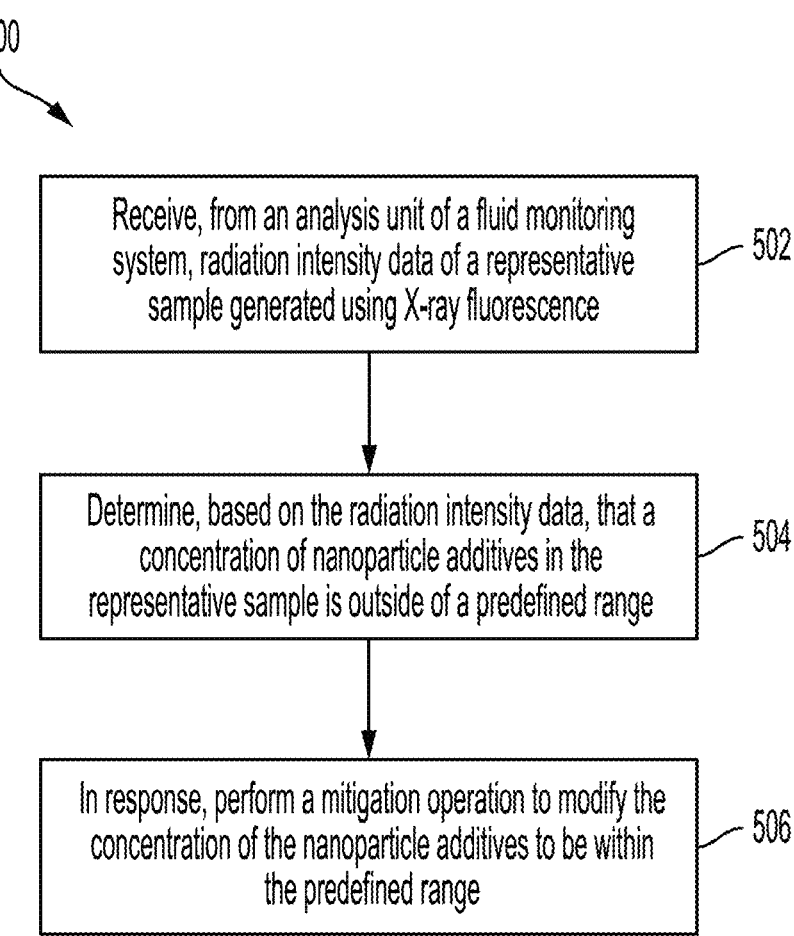
FIG. 5 is a flowchart describing a process for monitoring nanoparticle additives in wellbore treatment fluid using XRF according to one example of the present disclosure.

FIG. 5 is a flowchart describing a process 500 for monitoring nanoparticle additives 202 in wellbore treatment fluid 204 using X-ray fluorescence (XRF) according to one example of the present disclosure. While FIG. 5 depicts a certain sequence of steps for illustrative purposes, other examples can involve more steps, fewer steps different steps, or a different order of steps depicted in FIG. 5. The process 500 is described with references to components shown in FIGS. 1-3.

At block 502, the computing device 400 receives, from an analysis unit 214 of a fluid monitoring system 200, radiation intensity data 218 of a representative sample 212 generated using XRF. The representative sample 212 can be prepared by using a preparation unit 210 of the fluid monitoring system 200 to process a sample 206 of treatment fluid 204 collected from a wellbore 104. For example, a separation process can be performed by the preparation unit 210 to remove contaminants or extraneous compounds from the sample 206. Once the preparation unit 210 prepares the representative sample 212, the representative sample 212 can be transported to the analysis unit 214 to generate the radiation intensity data 218 of the representative sample 212 using XRF. In some examples, the computing device 400 may receive the radiation intensity data 218 via a wireless connection communicatively coupling the computing device 400 to a handheld device 300 that can function as the analysis unit 214.

At block 504, the computing device 400 determines, based on the radiation intensity data 218, that a concentration 216 of nanoparticle additives 202 in the representative sample 212 is outside of a predefined range 238. In some examples, the computing device 400 may execute software to perform quantitative analysis on the radiation intensity data 218 to determine a chemical composition of the representative sample 212. For example, the computing device 400 can use a respective peak height of one or more peaks in the radiation intensity data 218 to determine a respective element concentration to form the chemical composition of the representative sample 212.

The nanoparticle additives 202 can be synthesized to include an element 232 that can function as an identifier for the nanoparticle additives 202. Examples of the element 232 can include sulfur, silicon, phosphorus, etc. The element 232 can be uncommon in a downhole environment such that the computing device 400 can determine the concentration 216 of the nanoparticle additives 202 using the element concentration of the element 232. In some cases, the nanoparticle additives 202 can be created as core-shell nanoparticles that can include a core compound and a shell compound surrounding the core compound and including the element 232 targeted in XRF analysis. In other cases, the nanoparticle additives 202 can have a homogeneous composition (e.g., created using a single chemical compound). For example, if the nanoparticle additives 202 have a homogeneous composition, the nanoparticle additives 202 may lack a polymer shell.

At block 506, the computing device 400 performs a mitigation operation 240 to modify the concentration 216 of the nanoparticle additives 202 to be within the predefined range 238. The computing device 400 may perform the mitigation operation 240 in response to determining that the concentration 216 of the nanoparticle additives 202 in the representative sample 212 is outside of the predefined range 238. The nanoparticles additives 202 can be included in treatment fluid 204 pumped downhole in a wellbore 104 to improve properties of the treatment fluid 204 or the wellbore 104. Accordingly, unpredictable behavior in the downhole environment can be observed if the concentration 216 of the nanoparticle additives 202 is outside of the predefined range 238. For example, if the nanoparticle additives 202 increase fluid lubricity of the treatment fluid 204, a lack of sufficient lubrication during a drilling operation can result in excessive torque or friction on components (e.g., a drill bit 120) of a bottomhole assembly 112.

The computing device 400 can prevent or mitigate the unpredictable behavior by maintaining the concentration 216 of the nanoparticle additives 202 within the predefined range 238. In some examples, if the concentration 216 is below a minimum threshold of the predefined range 238, the computing device 400 can increase an inlet flow of the nanoparticle additives 202 with respect to the treatment fluid 204. In additional or alternative examples, if the concentration 216 is above a maximum threshold of the predefined range 248, the computing device 400 can dilute the treatment fluid 204 to lower the concentration 216 of the nanoparticle additives 202.

In some aspects, a system, method, and non-transitory computer-readable medium for monitoring nanoparticle additives in wellbore treatment fluid using XRF are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a fluid monitoring system positionable at a wellsite to monitor a concentration of a plurality of nanoparticle additives in a treatment fluid transportable downhole in a wellbore at the wellsite, the fluid monitoring system comprising: a preparation unit positionable to generate a representative sample of the treatment fluid; and an analysis unit positionable to chemically analyze the representative sample using X-ray fluorescence (XRF) to generate radiation intensity data associated with the representative sample; a processor; and a memory that comprises instructions executable by the processor for causing the processor to: receive, from the analysis unit, the radiation intensity data of the representative sample; determine, based on the radiation intensity data, whether the concentration of the plurality of nanoparticle additives in the representative sample is outside of a predefined range; and in response to determining that the concentration of the plurality of nanoparticle additives in the representative sample is outside of the predefined range, perform a mitigation operation to modify the concentration of the plurality of nanoparticle additives to be within the predefined range.

Example 2 is the system of example(s) 1, wherein the analysis unit is transportable as a handheld device, and wherein the handheld device comprises: a handle positionable for use by an operator of the analysis unit to position the analysis unit; an interactive element positionable on the handle and selectable by the operator to initiate the analysis unit to chemically analyze the representative sample; and a display device positionable to output the radiation intensity data of the representative sample that is determinable using XRF.

Example 3 is the system of example(s) 1-2, wherein the plurality of nanoparticle additives comprises (i) a core compound and (ii) a shell compound positionable to surround the core compound, and wherein the analysis unit is further usable to determine the concentration of the plurality of nanoparticle additives by targeting an element of the core compound or the shell compound to analyze using XRF.

Example 4 is the system of example(s) 1-3, wherein the core compound or the shell compound is a copolymer generatable by polymerizing a first monomer and a second monomer, and wherein the second monomer comprises the element targetable by the analysis unit.

Example 5 is the system of example(s) 1-4, wherein the preparation unit is positionable to perform a separation process to separate the representative sample from a sample of the treatment fluid by centrifuging the sample of the treatment fluid to form a supernatant including the plurality of nanoparticle additives, and wherein the supernatant is analyzable by the analysis unit to determine the concentration of the plurality of nanoparticle additives.

Example 6 is the system of example(s) 1-5, wherein the preparation unit comprises a filtration system positionable to perform a separation process to separate solid particles in a sample of the treatment fluid from the plurality of nanoparticle additives to form a filtrate as the representative sample, and wherein the filtrate containing the plurality of nanoparticle additives is analyzable by the analysis unit to determine the concentration of the plurality of nanoparticle additives.

Example 7 is the system of example(s) 1-6, wherein the preparation unit is positionable to perform a separation process to separate the representative sample from a sample of the treatment fluid by adding a solvent to the sample of the treatment fluid to selectively extract the plurality of nanoparticle additives into the solvent, and wherein the solvent containing the plurality of nanoparticle additives is analyzable by the analysis unit to determine the concentration of the plurality of nanoparticle additives.

Example 8 is a method comprising: receiving, from an analysis unit of a fluid monitoring system, radiation intensity data of a representative sample generated by the analysis unit using X-ray fluorescence, the representative sample generated by a preparation unit of the fluid monitoring system by performing a separation process with respect to a sample of a treatment fluid transported downhole in a wellbore; determining, based on the radiation intensity data, whether a concentration of a plurality of nanoparticle additives in the representative sample is outside of a predefined range; and in response to determining that the concentration of the plurality of nanoparticle additives in the representative sample is outside of the predefined range, performing a mitigation operation to modify the concentration of the plurality of nanoparticle additives to be within the predefined range.

Example 9 is the method of example(s) 8, wherein the analysis unit is transported as a handheld device, and wherein the handheld device comprises: a handle positioned for use by an operator of the analysis unit to position the analysis unit; an interactive element positioned on the handle and selectable by the operator to initiate the analysis unit to chemically analyze the representative sample; and a display device that outputs the radiation intensity data of the representative sample that is generated using XRF.

Example 10 is the method of example(s) 8-9, wherein the plurality of nanoparticle additives comprises (i) a core compound and (ii) a shell compound surrounding the core compound, and wherein the analysis unit further determines the concentration of the plurality of nanoparticle additives by targeting an element of the core compound or the shell compound to analyze using XRF.

Example 11 is the method of example(s) 8-10, wherein the core compound or the shell compound is a copolymer generated by polymerizing a first monomer and a second monomer, and wherein the second monomer comprises the element targeted by the analysis unit.

Example 12 is the method of example(s) 8-11, wherein the preparation unit separates the representative sample from the sample of the treatment fluid by centrifuging the sample of the treatment fluid to form a supernatant including the plurality of nanoparticle additives, and wherein the supernatant is analyzed by the analysis unit to determine the concentration of the plurality of nanoparticle additives.

Example 13 is the method of example(s) 8-12, wherein the preparation unit comprises a filtration system that separates solid particles in the sample of the treatment fluid from the plurality of nanoparticle additives to form a filtrate as the representative sample, and wherein the filtrate is analyzed by the analysis unit to determine the concentration of the plurality of nanoparticle additives.

Example 14 is the method of example(s) 8-13, further comprising, subsequent to receiving the radiation intensity data of the representative sample: determining that the concentration of the plurality of nanoparticle additives in the representative sample is within the predefined range; and forgoing performing the mitigation operation to modify the concentration of the plurality of nanoparticle additives.

Example 15 is a non-transitory computer-readable medium comprising program code that is executable by a processing device for causing the processing device to: receive, from an analysis unit of a fluid monitoring system, radiation intensity data of a representative sample generated by the analysis unit using X-ray fluorescence, the representative sample generated by a preparation unit of the fluid monitoring system by performing a separation process with respect to a sample of a treatment fluid transported downhole in a wellbore; determine, based on the radiation intensity data, whether a concentration of a plurality of nanoparticle additives in the representative sample is outside of a predefined range; and in response to determining that the concentration of the plurality of nanoparticle additives in the representative sample is outside of the predefined range, perform a mitigation operation to modify the concentration of the plurality of nanoparticle additives to be within the predefined range.

Example 16 is the non-transitory computer-readable medium of example(s) 15, wherein the representative sample is dehydrated by the preparation unit to form a solid sample, and wherein the radiation intensity data is generated from the solid sample.

Example 17 is the non-transitory computer-readable medium of example(s) 15-16, wherein the plurality of nanoparticle additives comprises (i) a core compound and (ii) a shell compound surrounding the core compound, and wherein the concentration of the plurality of nanoparticle additives is determined through targeting an element of the core compound or the shell compound using X-ray fluorescence.

Example 18 is the non-transitory computer-readable medium of example(s) 15-17, wherein the core compound or the shell compound is a copolymer generated by polymerizing a first monomer and a second monomer, and wherein the second monomer comprises the element targeted by the analysis unit.

Example 19 is the non-transitory computer-readable medium of example(s) 15-18, wherein the representative sample comprises a supernatant of the sample of the treatment fluid generated by the preparation unit by centrifuging the sample of the treatment fluid, and wherein the supernatant is analyzed by the analysis unit to determine the concentration of the plurality of nanoparticle additives.

Example 20 is the non-transitory computer-readable medium of example(s) 15-19, wherein the program code is further executable for causing the processing device to, subsequent to receiving the radiation intensity data of the representative sample: determine that the concentration of the plurality of nanoparticle additives in the representative sample is within the predefined range; and forgo performing the mitigation operation to modify the concentration of the plurality of nanoparticle additives.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a fluid monitoring system positionable at a wellsite to monitor a concentration of a plurality of nanoparticle additives in a treatment fluid transportable downhole in a wellbore at the wellsite, the plurality of nanoparticle additives provided in the treatment fluid to control fluid loss, wherein the fluid monitoring system is positionable to:
generate a representative sample of the treatment fluid; and analyze the representative sample using X-ray fluorescence (XRF) to generate radiation intensity data associated with the representative sample;
a processor; and
a memory that comprises instructions executable by the processor for causing the processor to:
receive the radiation intensity data of the representative sample;
determine, based on the radiation intensity data, whether the concentration of the plurality of nanoparticle additives in the representative sample is outside of a predefined range to control fluid loss in the wellbore; and
in response to determining that the concentration of the plurality of nanoparticle additives in the representative sample is outside of the predefined range, perform a mitigation operation to modify the concentration of the plurality of nanoparticle additives to be within the predefined range.

2. The system of claim 1, wherein the fluid monitoring system comprises a handheld device, and wherein the handheld device comprises:
a handle positionable for use by an operator to position the handheld device;
an interactive element positionable on the handle and selectable by the operator to initiate the handheld device to chemically analyze the representative sample; and
a display device positionable to output the radiation intensity data of the representative sample that is determinable using XRF.

3. The system of claim 1, wherein the plurality of nanoparticle additives comprises (i) a core compound and (ii) a shell compound positionable to surround the core compound, and wherein the fluid monitoring system is further operable to determine the concentration of the plurality of nanoparticle additives by targeting an element of the core compound or the shell compound to analyze using XRF.

4. The system of claim 3, wherein the core compound or the shell compound is a copolymer generatable by polymerizing a first monomer and a second monomer, and wherein the second monomer comprises the element targetable by the fluid monitoring system.

5. The system of claim 1, wherein the fluid monitoring system is further positionable to perform a separation process to separate the representative sample from a sample of the treatment fluid by centrifuging the sample of the treatment fluid to form a supernatant including the plurality of nanoparticle additives, and wherein the supernatant is analyzable by the fluid monitoring system to determine the concentration of the plurality of nanoparticle additives.

6. The system of claim 1, wherein the fluid monitoring system further comprises a filtration system positionable to perform a separation process to separate solid particles in a sample of the treatment fluid from the plurality of nanoparticle additives to form a filtrate as the representative sample, and wherein the filtrate containing the plurality of nanoparticle additives is analyzable by the fluid monitoring system to determine the concentration of the plurality of nanoparticle additives.

7. The system of claim 1, wherein the fluid monitoring system is further positionable to perform a separation process to separate the representative sample from a sample of the treatment fluid by adding a solvent to the sample of the treatment fluid to selectively extract the plurality of nanoparticle additives into the solvent, and wherein the solvent containing the plurality of nanoparticle additives is analyzable by the fluid monitoring system to determine the concentration of the plurality of nanoparticle additives.

8. A method comprising:

receiving, from a fluid monitoring system, radiation intensity data of a representative sample, the radiation intensity data generated using X-ray fluorescence, wherein the representative sample is generated by the fluid monitoring system by performing a separation process with respect to a sample of a treatment fluid transported downhole in a wellbore, wherein the treatment fluid comprises a plurality of nanoparticle additives to control fluid loss;

determining, based on the radiation intensity data, whether a concentration of the plurality of nanoparticle additives in the representative sample is outside of a predefined range to control fluid loss in the wellbore; and in response to determining that the concentration of the plurality of nanoparticle additives in the representative sample is outside of the predefined range, performing a mitigation operation to modify the concentration of the plurality of nanoparticle additives to be within the predefined range.

9. The method of claim 8, wherein the fluid monitoring system comprises a handheld device, and wherein the handheld device comprises:

a handle positioned for use by an operator to position the handheld device;

an interactive element positioned on the handle and selectable by the operator to initiate the handheld device to chemically analyze the representative sample; and a display device that outputs the radiation intensity data of the representative sample that is generated using XRF.

10. The method of claim 8, wherein the plurality of nanoparticle additives comprises (i) a core compound and (ii) a shell compound surrounding the core compound, and wherein the method further comprises determining the concentration of the plurality of nanoparticle additives by targeting an element of the core compound or the shell compound to analyze using XRF.

11. The method of claim 10, wherein the core compound or the shell compound is a copolymer generated by polymerizing a first monomer and a second monomer, and wherein the second monomer comprises the element targeted by the fluid monitoring system.

12. The method of claim 8, wherein the fluid monitoring system separates the representative sample from the sample of the treatment fluid by centrifuging the sample of the treatment fluid to form a supernatant including the plurality of nanoparticle additives, and wherein the supernatant is analyzed by the fluid monitoring system to determine the concentration of the plurality of nanoparticle additives.

13. The method of claim 8, wherein the fluid monitoring system comprises a filtration system that separates solid particles in the sample of the treatment fluid from the plurality of nanoparticle additives to form a filtrate as the representative sample, and wherein the filtrate is analyzed by the fluid monitoring system to determine the concentration of the plurality of nanoparticle additives.

14. The method of claim 8, further comprising, subsequent to receiving the radiation intensity data of the representative sample:

determining that the concentration of the plurality of nanoparticle additives in the representative sample is within the predefined range; and forgoing performing the mitigation operation to modify the concentration of the plurality of nanoparticle additives.

15. A non-transitory computer-readable medium comprising program code that is executable by a processing device for causing the processing device to:

receive, from a fluid monitoring system, radiation intensity data of a representative sample, the radiation intensity data generated using X-ray fluorescence, wherein the representative sample is generated by the fluid monitoring system by performing a separation process with respect to a sample of a treatment fluid transported downhole in a wellbore, wherein the treatment fluid comprise a plurality of nanoparticle additives to control fluid loss;

determine, based on the radiation intensity data, whether a concentration of the plurality of nanoparticle additives in the representative sample is outside of a predefined range to control fluid loss in the wellbore; and in response to determining that the concentration of the plurality of nanoparticle additives in the representative sample is outside of the predefined range, perform a mitigation operation to modify the concentration of the plurality of nanoparticle additives to be within the predefined range.

16. The non-transitory computer-readable medium of claim 15, wherein the representative sample is dehydrated by the fluid monitoring system to form a solid sample, and wherein the radiation intensity data is generated from the solid sample.

17. The non-transitory computer-readable medium of claim 15, wherein the plurality of nanoparticle additives comprises (i) a core compound and (ii) a shell compound surrounding the core compound, and wherein the concentration of the plurality of nanoparticle additives is determined through targeting an element of the core compound or the shell compound using X-ray fluorescence.

18. The non-transitory computer-readable medium of claim 17, wherein the core compound or the shell compound is a copolymer generated by polymerizing a first monomer and a second monomer, and wherein the second monomer comprises the element targeted by the fluid monitoring system.

19. The non-transitory computer-readable medium of claim 15, wherein the representative sample comprises a supernatant of the sample of the treatment fluid generated by the fluid monitoring system by centrifuging the sample of the treatment fluid, and wherein the supernatant is analyzed by the fluid monitoring system to determine the concentration of the plurality of nanoparticle additives.

20. The non-transitory computer-readable medium of claim 15, wherein the program code is further executable for causing the processing device to, subsequent to receiving the radiation intensity data of the representative sample:

determine that the concentration of the plurality of nanoparticle additives in the representative sample is within the predefined range; and forgo performing the mitigation operation to modify the concentration of the plurality of nanoparticle additives.

* * * * *